(No Model.)

R. HOWARTH.
NUT LOCK.

No. 321,500. Patented July 7, 1885.

WITNESSES:
E. B. Bolton
Geo. H. Fraser

INVENTOR:
Robert Howarth
By his Attorneys
Burke Fraser Bennett

UNITED STATES PATENT OFFICE.

ROBERT HOWARTH, OF WOLVERHAMPTON, COUNTY OF STAFFORD, ENGLAND, ASSIGNOR TO MOSES BAYLISS, EDWIN JONES, WILLIAM BAYLISS, SAMUEL BAYLISS, AND WILLIAM EDWIN JONES.

NUT-LOCK.

SPECIFICATION forming part of Letters Patent No. 321,500, dated July 7, 1885.

Application filed July 2, 1884. (No model.) Patented in England May 12, 1884, No. 7,589, and in Belgium February 18, 1885, No. 67,927.

*To all whom it may concern:*

Be it known that I, ROBERT HOWARTH, a subject of the Queen of Great Britain, residing at Wolverhampton, in the county of Stafford, England, have invented certain new and useful improvements in means for preventing nuts and bolts or other screwed parts from working loose, (for which invention Letters Patent have been applied for in England, the application being dated the 12th day of May, 1884, and numbered 7,589, but such Letters Patent have not yet been granted,) of which the following is a specification.

The main purpose of this invention is to form a nut for screw-bolts (and for other articles having a male or external screw thread) in such a manner as that the nut shall distort the convolutions of the thread upon the screw-bolt as the same pass through the part of the nut adjacent to the outer face as the nut is screwed up thereon, such distorted convolutions of the thread securely preventing the nut from becoming unscrewed by any jarring action to which it may be subjected.

The means by which this invention may be carried into effect are illustrated by the drawings herewith, of which—

Figure 2:
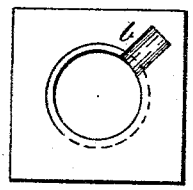
Figure 1:
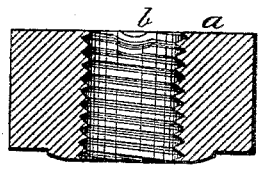

Figure 1 is a transverse section taken diagonally through an ordinary screwed nut, and Fig. 2 a back or outer elevation of the same—that is, of the face $a$, Fig. 1.

A fullered-ended tool is driven or pressed against the outer face of the nut, so as to produce a grooved or pressed-down part, $b$, by which means the outer convolution or convolutions of the thread are pressed down or indented in one place around their circumference with the general pressing down or indenting of the metal occasioned by the tool. This pressing down of the outer convolutions of the thread is clearly shown at Fig. 1. As this nut is afterward screwed upon its bolt (or corresponding part) the unaltered convolutions of the thread, being those through the greater thickness of the nut, as shown, are readily screwed upon the bolt; but when the pressed-down or indented parts come to be screwed thereon the effect is to distort those convolutions of the the thread of the bolt upon which the pressed-down or indented convolutions of the thread of the nut are screwed—that is to say, such convolutions of the thread of the bolt are forced out of pitch or gage with the remaining convolutions of the thread of the bolt.

Figure 3:
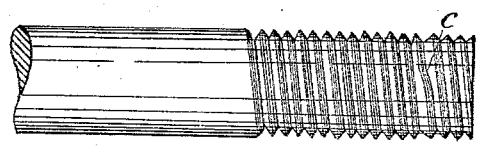

Fig. 3 illustrates the screwed end of a bolt upon which a nut with pressed-down or indented convolutions of the thread has been screwed up but not screwed back. The nut is omitted in the illustration.

$c$ shows the distortion in the convolutions of the thread of the bolt at the point up to which a pressed-down or indented convolution of the thread of the nut has been screwed. Each of the outer convolutions of the thread of the bolt are distorted as a pressed-down or indented convolution of the thread of a nut is screwed up thereon; but the distortion shows chiefly at the point up to which a pressed-down or indented convolution of the thread of the nut is screwed as the remaining outer convolutions of the thread of the bolt have been equally distorted throughout, and show therefore to a regular pitch together, although out of true pitch with the remaining convolutions of the thread, and also altered in shape therefrom. The nut with the pressed down or indented convolutions of the thread is thus securely locked upon the bolt and prevented from becoming unscrewed by any jarring action to which it may be subjected. The effect is of course the same whether the nut is screwed up upon the bolt or the bolt screwed up within the nut. One or more of the convolutions of the thread of a nut may of course be pressed down or indented in any convenient manner otherwise than simply by the fullered tool referred to; and the convolution or convolutions may be pressed down or indented in one only or more places around the circumference, as desired.

Figure 4:
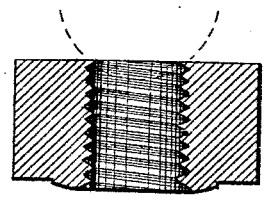

Fig. 4 is a corresponding view to Fig. 1. According to this view the outer convolution of the thread of the nut is pressed downward around its entire circumference by means of a dome-ended tool, the bottom of which is indicated by dotted lines.

Figure 6:
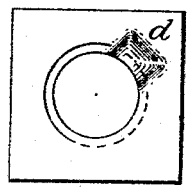
Figure 5:
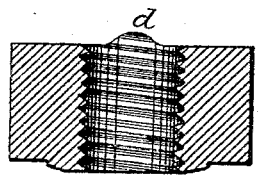
Figure 7:
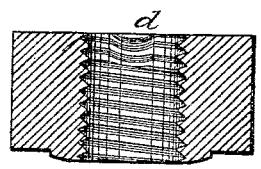

Fig. 5 is a corresponding section to Fig. 1, and Fig. 6 a corresponding view to Fig. 2. In these two figures, however, *d* is a projection or lump formed upon the nut-blank. After the nut has been screwed in the ordinary manner this projection *d* is hammered or pressed down, as shown at Fig. 7, thus pressing down or indenting the outer convolutions of the thread of the nut with the same effect as in the other cases of pressing down or indenting the convolution or convolutions of the thread. One only of these projections *d* or more may be employed, as desired, or a projection may be formed around the entire circumference of the edge of the hole through the nut at the outer face thereof when forming the nut-blank, and this projection be hammered or pressed down, so as to press down or indent the convolution or convolutions of the thread next to the outer face of the nut.

In this specification the expressions "pressed down," "press down," and "pressing down," in relation to a convolution or convolutions of a thread, refer to the distortion of such convolution or convolutions in a direction parallel, or approximately so, with the axis around which such thread convolutes, whether such distortion has been or is produced by actual pressing down or in an analogous manner.

It will be seen that my improved construction of nuts are self-locking quite independently of any special attention on the part of the person whose duty it may be to screw them upon their bolts (or corresponding parts) as there are no loose or extra parts thereto to be fixed or placed in position.

This invention is of course applicable also, as will be readily understood, in the case of deck-plates, of a certain description of fish-plates, and various other articles which have a hole or holes therethrough screwed to receive a screwed bolt or bolts or other part or parts having a male or external screw-thread thereon.

Having thus stated the nature of my said invention, and particularly described the manner of performing the same, I declare that what I claim is—

1. A nut or other analogous article which has internal screw-threads, having one or more of the convolutions of its screw-thread pressed or indented in the direction of the nut-axis, substantially as described, to form a locking device, whereby, when said nut is screwed onto a bolt or other analagous article having an external screw-thread, the indented portion of the thread in the nut will distort or force out of true pitch some portion of the convolutions of the thread on the bolt, as set forth.

2. A nut or other analogous article which has internal screw-threads, having a lump or projection, *d*, formed on its face, in which a portion of the screw-thread is formed, whereby, when this lump or projection is hammered down, as described, in the direction of the nut-axis, the threads of the screw in the nut will be distorted, as and for the purposes set forth.

In witness whereof I have hereunto signed my name in the presence of two subscribing witnesses.

ROBERT HOWARTH.

Witnesses:
STEPHEN WATKINS,
ROBERT M. LISTER.